United States Patent
Soichi et al.

(10) Patent No.: US 6,188,735 B1
(45) Date of Patent: Feb. 13, 2001

(54) DATA DECODING APPARATUS AND METHOD UTILIZING A SINGLE CHANNEL MAXIMUM LIKELIHOOD DECODER

(75) Inventors: Iwamura Soichi; Jin-kyu Jeon, both of Suwon (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/032,115

(22) Filed: Feb. 27, 1998

(30) Foreign Application Priority Data

Jul. 10, 1997 (KR) .................................................. 97-31992

(51) Int. Cl.$^7$ ............................... H03D 1/00; H04L 27/06
(52) U.S. Cl. .......................... 375/341; 375/262; 714/795
(58) Field of Search ................................. 375/262, 263, 375/264, 286, 287, 290, 341, 355; 714/794, 795; 360/32

(56) References Cited

U.S. PATENT DOCUMENTS

| | | | |
|---|---|---|---|
| 5,392,316 | * | 2/1995 | Sawaguchi et al. . |
| 5,568,330 | * | 10/1996 | Sawaguchi et al. .................... 360/46 |
| 5,638,065 | * | 6/1997 | Hassner et al. ......................... 341/59 |
| 5,861,825 | * | 1/1999 | Ino ........................................ 341/50 |
| 5,872,666 | * | 2/1999 | Saiki et al. ............................. 360/46 |
| 5,903,404 | * | 5/1999 | Tsurumi et al. ........................ 360/48 |
| 5,949,357 | * | 9/1999 | Fitzpatrick et al. ................... 341/68 |
| 6,035,435 | * | 3/2000 | Shih et al. ............................ 714/795 |

FOREIGN PATENT DOCUMENTS 4-355268  12/1992  (JP) .............................. G11B/20/10

* cited by examiner

Primary Examiner—Chi H. Pham
Assistant Examiner—Jean B. Corrielus
(74) Attorney, Agent, or Firm—Sughrue, Mion, Zinn, Macpeak & Seas, PLLC

(57) ABSTRACT

A data decoding apparatus and method are provided for decoding a reproduction signal in a digital magnetic recording/reproducing apparatus. A Viterbi decoder having a single channel is constructed such that the noise level corresponds to that of an EnPR4 system and the aperture ratio of an eye pattern corresponds to that of a PR(+1, −1) system, thereby improving the efficiency of the Viterbi decoder and allowing state detection by the PR(+1, −1) system. Data can be decoded by a system having a PR4 or E$^n$PR4 channel or selectively by other various systems.

25 Claims, 9 Drawing Sheets

FIG. 9C

DATA DECODING APPARATUS AND METHOD UTILIZING A SINGLE CHANNEL MAXIMUM LIKELIHOOD DECODER

BACKGROUND OF THE INVENTION

The present invention relates to a data decoding apparatus and method, and more particularly, to a data decoding apparatus and method for reducing hardware size by decoding data using a single channel maximum likelihood decoder in a digital recording/reproducing apparatus having a partial-response class 4 (PR4) or extended-partial response class 4 ($E^n$PR4) channel.

Techniques related to a Partial Response Maximum Likelihood (PRML) have been developed, including a Viterbi decoding processing, as methods for increasing recording density by a signal processing without greatly changing characteristics of a conventional recording and reproducing apparatus.

FIG. 1 is a block diagram of a digital video cassette recorder (DVCR) having a PR4(1, 0, −1) channel. In FIG. 1, a Non-Return-to-Zero-Inversion (NRZI) converter 102 converts an input signal into an NRZI code represented by 1 or −1. A precoder 108 converts the NRZI code into an interleave NRZI code. Here, the NRZI converter 102 and the precoder 108 are constructed to have a 1/1+D characteristic, where D refers to a 1-bit delay (unit delay) of recording data. In the NRZI converter 102 or the precoder 108 having a 1/1+D structure, an input signal and a signal delayed by a delay element 106 or 112 are input to an XOR gate 104 or 110 and the XOR-performed signal is fed back to the delay element.

A reproducing amplifier 116 of a reproducing system amplifies a reproduction signal through a channel 114 having a 1−D characteristic, i.e., a differential characteristic. At this time, the amplified reproduction signal is a PR(+1, −1) mode signal. An equalizer 118 compensates for waveform distortion and amplitude distortion of the signal amplified in the reproducing amplifier 116. A channel demodulator 120 having a 1+D characteristic, i.e., an integral characteristic, converts a PR(+1, −1) mode signal output from the equalizer 118 into a PR4(+1, 0, −1) mode signal. In other words, the channel demodulator 120 includes an adder 124 and a delay 122 and has the 1+D characteristic inverse to the 1/1+D characteristic of the precoder 108, so that noise characteristics are improved and the aperture ratio of an eye pattern is decreased. A timing detector 140 detects timing of the reproduction signal equalized in the equalizer 118 using an internally installed phase locked loop (PLL) and outputs driving clocks required for the equalizer 118 and the maximum likelihood decoder 126.

Here, since the recording system of the digital recording/reproducing apparatus having the PR4 channel includes two delays, the reproducing system requires four ($2^2$) 4-state Viterbi decoders. However, in the DVCR, since two (1+D) channels are interleaved, 2-state Viterbi decoders are necessary. In other words, the maximum likelihood decoder 126 shown in FIG. 1 is constructed such that two state detectors 130 and 132 and two Viterbi decoders 134 and 136, performing the same operation, are connected in parallel, respectively. A demultiplexer 128 and a multiplexer 138 operate according to a driving clock output from a timing detector 140. Decoded data is output from the multiplexer 138.

The reason why the state detectors and the Viterbi decoders are constructed by two channels is to apply a Viterbi algorithm such that PR4(+1, 0, −1) data output from a channel demodulator 120 is converted into PR(+1, −1) data, to satisfy conditions that "0" or "−1" is read out after "+1" and "+1" is never read out, and that "0" or "+1" is read out after "−1" and "−1" is never read out.

Further, the DVCR having the PR4 channel shown in FIG. 1 may perform decoding of data using the maximum likelihood decoding algorithm such as Viterbi decoding algorithm, which is referred to as a PRML system.

FIG. 2 is a block diagram of a digital recording/reproducing system having an EPR4(1, 1, −1, −1) channel having the simplest structure among $E^n$PR4 channels. A detailed explanation of the same elements corresponding to those shown in FIG. 1 will be omitted herein. A typical example of the digital recording/reproducing apparatus having the EPR4 channel is a hard disk driver.

In FIG. 2, compared to the PR4 system shown in FIG. 1, a precoder 208 includes one more delay 214 to have a $1/(1+D)^2$ characteristic, in which the precoder 208 is called an EPR4(1, 1, −1, −1) precoder. Since a recording system includes three delays 206, 212 and 214, a reproducing system requires $2^3$ 8-state Viterbi decoders 250 through 264 and eight state detectors 234 through 248. Also, a channel demodulator 222 includes an adder 228 and two delays 224 and 226 to have a $(1+D)^2$ characteristic, in correspondence with the precoder 208 having the $1/(1+D)^2$ characteristic. In FIG. 2, "SD" refers to a state detector and "VD" refers to a Viterbi decoder. A driving clock CK output from a timing detector 268 is supplied to a demultiplexer 232, first through eighth Viterbi decoders 250 through 264 and a multiplexer 266. Reference numerals 218 and 220 denote an amplifier and an equalizer, respectively.

FIG. 3 is a block diagram of a digital recording/reproducing apparatus having an $E^n$PR4 channel. A channel demodulator 312 corresponding to a precoder 304 having a $1/(1+D)^{n+1}$ characteristic is constructed to have a $(1+D)^{n+1}$ characteristic. A maximum likelihood decoder 314 includes $2^{n+2}$ Viterbi decoders, $2^{n+2}$ state detectors, a demultiplexer for demultiplexing outputs of the channel demodulator 312 to output to the $2^{n+2}$ state detectors, and a multiplexer for multiplexing outputs of the $2^{n+2}$ Viterbi decoders to output decoded data. In other words, each $2^{n+2}$ of the state detectors and the Viterbi decoders are constructed in parallel. Demodulated data are demultiplexed into $2^{n+2}$ channels, independently decoded by the Viterbi decoders constructed to correspond to the respective channels and then multiplexed again. This is for applying a Viterbi algorithm by separating the $E^n$PR4 signals of the channel demodulator 312 into PR(1, −1) signals to satisfy conditions that "0" or "−1" is read after "+1" and "+1" is never read, and that "0" or "+1" is read after "−1" and "−1" is never read.

An EPR4 system and an $E^2$PR4 system are more resistant to noise than a PR4 system and an EPR4 system, respectively, and signal bands thereof are reduced. Thus, the recording density of a channel band is increased. However, the aperture ratio of an eye pattern is decreased and the hardware becomes complex. In other words, the conventional PR4 system requires four maximum likelihood decoders constructed in parallel (two for a DVCR), the EPR4 system requires eight maximum likelihood decoders constructed in parallel, and the $E^n$PR4 system requires $2^{n+2}$ maximum likelihood decoders constructed in parallel. Thus, the hardware burden becomes greatly increased.

SUMMARY OF THE INVENTION

It is a first object of the present invention to provide a data decoding apparatus which can greatly decrease hardware size by decoding data using a maximum likelihood decoder having a single channel while maintaining the performance of a PR4 system in view of noise, in a digital recording/reproducing apparatus having a PR4 channel.

It is a second object of the present invention to provide a data decoding apparatus which can greatly decrease the hardware size by decoding data using a maximum likelihood decoder having a single channel while maintaining the performance of an E"PR4 system in view of noise, in a digital recording/reproducing apparatus having an E"PR4 channel.

It is a third object of the present invention to provide a data decoding apparatus for selectively decoding data into a PR4 mode or an E"PR4 mode, in a digital recording/reproducing apparatus in which data is recorded in a PR4 mode.

It is a fourth object of the present invention to provide a data decoding apparatus for decoding data into various types, in a digital recording/reproducing apparatus in which data is recorded in an E"PR4 mode.

It is a fifth object of the present invention to provide a data decoding method for decoding data in a PR(+1, −1) state by a maximum likelihood decoder having a single channel while maintaining the performance of a PR4 system in view of noise, in a digital recording/reproducing apparatus having a PR4 channel.

It is a sixth object of the present invention to provide a data decoding method for decoding data in a PR(+1, −1) state by a maximum likelihood decoder having a single channel while maintaining the performance of an E"PR4 system in view of noise, in a digital recording/reproducing apparatus having an E"PR4 channel.

It is a seventh object of the present invention to provide a data decoding method for selectively decoding data into a PR4 mode or an E"PR4 mode by a maximum likelihood decoder comprised of a channel, in a digital recording/reproducing apparatus in which data is recorded in a PR4 mode.

It is an eighth object of the present invention to provide a data decoding method for decoding data into various types by a maximum likelihood decoder comprised of a channel, in a digital recording/reproducing apparatus in which data is recorded in an E"PR4 mode.

To accomplish the objects of the present invention, there is provided a data decoding apparatus in a system having a PR4 channel including a precoder having a $1/(1+D)$ characteristic, the data decoding apparatus comprising: a maximum likelihood decoder having a single channel, for maximum-likelihood-decoding a PR(+1, −1) signal received through the channel to output maximum-likelihood-decoded data; and a channel demodulator having a (1+D) characteristic which is a inverse characteristic of the precoder, for channel-demodulating the maximum-likelihood-decoded data to output decoded data.

According to another aspect of the present invention, there is provided a data decoding apparatus in a system having an E"PR4 channel including a precoder having a $1/(1+D)^{n+1}$ characteristic, the data decoding apparatus comprising: a unit having a pre-filter having a (1+D) characteristic, for converting the PR(+1, −1) signal received through the channel into a PR4(+1, 0, −1) signal, a state detector for detecting positive and negative state values of the PR(+1, −1) signal depending on positive and negative threshold values varying according to the PR(+1, −1), and a inverse pre-filter having a $1/(1+D)$ characteristic, for feed-back receiving the positive and negative state values, con- verting again the PR4(+1, 0, −1) signal into the PR(+1, −1) signal and outputting the converted signal to the state detector, n+1 sets of the precoder, the state decoder and the inverse pre-filter being connected in series; a Viterbi decoder having a single channel, for Viterbi-decoding the PR(+1, −1) signal output from the unit and outputting the Viterbi-decoded data; and a channel demodulator having a $(1+D)^{n+1}$ characteristic which is a inverse characteristic of the precoder, for channel-demodulating the Viterbi-decoded data to output decoded data.

According to another aspect of the present invention, there is provided a data decoding apparatus in a system having a PR4 channel including a precoder having a $1/(1+D)$ characteristic, the data decoding apparatus comprising: a unit having a pre-filter having a (1+D) characteristic, for converting the PR(+1, −1) signal received through the channel into a PR4(+1, 0, −1) signal, a state detector for detecting positive and negative state values depending on positive and negative threshold values varying according to the PR(+1, −1) signal, and a inverse pre-filter having a $1/(1+D)$ characteristic, for feed-back receiving the positive and negative state values, converting again the PR4(+1, 0, −1) signal into the PR(+1, −1) signal and outputting the converted signal to the state detector, n+1 sets of the precoder, the state decoder and the inverse pre-filter being connected in series; a Viterbi decoder comprised of a channel, for Viterbi-decoding the PR(+1, −1) signal output from the unit and outputting the Viterbi-decoded data; and a first channel demodulator having a (1+D) characteristic which is a inverse characteristic of the precoder, for channel-demodulating the Viterbi-decoded data to output decoded data of a PR4 mode; a second channel demodulator having a $(1+D)^n$ characteristic, for channel-demodulating the output of the first channel demodulator to output decoded data of an E"PR4 mode; and a selector for selecting one of the outputs of the first and second channel demodulators according to a PR4/E"PR4 mode signal.

Further, there is provided a data decoding method for a system having a PR4 channel including a precoder having a $1/(1+D)$ characteristic, the data decoding method comprising the steps of: (a) directly maximum-likelihood-decoding a PR(+1, −1) signal received through the channel to output maximum-likelihood-decoded data; and (b) unit-bit delaying the maximum-likelihood-decoded data to have a (1+D) characteristic which is a inverse characteristic of the precoder, adding the delayed data to the maximum-likelihood decoded data to output decoded data.

Further, there is provided a data decoding method in a system having an E"PR4 channel including a precoder having a $1/(1+D)^{n+1}$ characteristic, the data decoding method comprising the steps of: (a) unit-bit delaying a PR(+1, −1) signal received through the channel to have a (1+D) characteristic, adding the delayed signal to the PR(+1, −1) signal to convert the result into a PR4(+1, 0, −1) signal; (b) subtracting the PR4(+1, 0, −1) signal from a feed-back signal to have a (1+D) characteristic, to convert again the result into the PR(+1, −1) signal; (c) detecting positive and negative state values of the PR(+1, −1) signal depending on positive and negative threshold values varying according to the PR(+1, −1) signal converted in the (b) step, and outputting the feed-back signal obtained by adding the positive state value to the negative state value; (d)repeating the (a) through (c) steps (n+1)-times; (e) Viterbi-decoding the PR(+1, −1) signal output after performing the (d) step, and outputting the Viterbi-decoded data; and (f) adding (n+1)-bit delayed data of the Viterbi-decoded data to the Viterbi-decoded data to have a $(1+D)^{n+1}$ characteristic which is a inverse characteristic of the precoder, and outputting decoded data.

Further, there is provided a data decoding method in a system having a PR4 channel including a precoder having a 1/(1+D) characteristic, the data decoding method comprising the steps of: (a) unit-bit delaying a PR(+1, −1) signal received through the channel to have a (1+D) characteristic, adding the delayed signal to the PR(+1, −1) signal to convert again the result into the PR(+1, 0, −1) signal; (b) subtracting the PR(+1, 0, −1) signal from a feed-back signal to have a (1+D) characteristic, to convert again the result into the PR(+1, −1) signal; (c) detecting positive and negative state values of the PR(+1, −1) signal depending on positive and negative threshold values varying according to the PR(+1, −1) signal converted in the (b) step, and outputting the feed-back signal obtained by adding the positive state value to the negative state value; (d) repeating the (a) through (c) steps (n+1)-times; (e) Viterbi-decoding the PR(+1, −1) signal output after performing the (d) step, and outputting the Viterbi-decoded data; and (f) unit-bit delaying the Viterbi-decoded data with the Viterbi-decoded data to have a (1+D) characteristic which is a inverse characteristic of the precoder, and adding the delayed data to the Viterbi-decoded data to output a PR4-mode decoded data (g) n-bit delaying the PR4-mode decoded data to have a $(1+D)^n$ characteristic, and adding the n-bit delayed data to the PR4-mode decoded data to output $E^n$PR4-mode decoded data; and (h) selecting one of the PR4-mode decoded data and the $E^n$PR4-mode decoded data according to a PR4/$E^n$PR4 mode signal.

BRIEF DESCRIPTION OF THE DRAWINGS

The above objects and advantages of the present invention will become more apparent by describing in detail preferred embodiments thereof with reference to the attached drawings in which:

FIGS. 9A through 9L are operational waveform diagrams of the data decoding apparatus shown in FIG. 8.

DETAILED DESCRIPTION OF THE INVENTION

Figure 4:
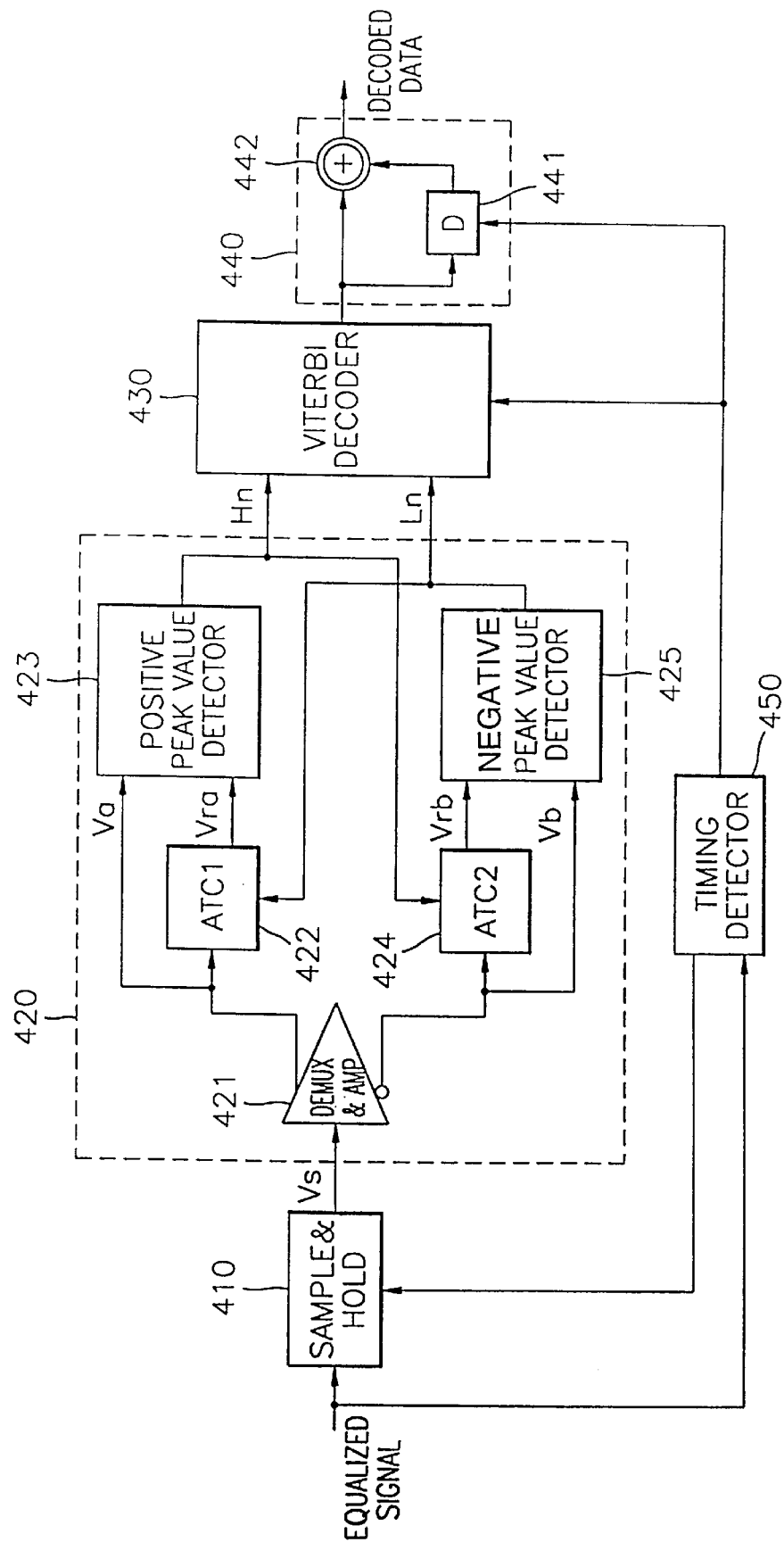
FIG. 4 is a block diagram of a data decoding apparatus according to an embodiment of the present invention.

In FIG. 4, a sample and hold circuit (SAMPLE & HOLD 410) samples and holds an equalized signal output from an equalizer (not shown). Here, the output state of the SAMPLE & HOLD 410 retains an analog level at the moment when sampling is performed according to driving clocks generated in a timing detector 450, not a digital level "1" or "0."

A peak detector 420 is an example of an implemented state detector. In other words, a positive peak value detector 423 and a negative peak value detector 425 are examples of a positive state value detector and a negative state value detector, respectively. A positive peak value detecting threshold value (to be referred to as a positive threshold value hereinafter) and a negative peak value detecting threshold value (to be referred to as a negative threshold value hereinafter) are set in conjunction with a signal Vs output from the SAMPLE & HOLD 410 of the peak detector 420. The respective threshold values are controlled by peak detection values having opposite polarities to each other. A positive peak value (Hn) and a negative peak value (Ln) are detected from the signal equalized according to the set threshold values.

In other words, a demultiplexer and an amplifier (DEMUX & AMP 421) of the peak detector 420 detects only positive (+) values from the signal Vs output from the SAMPLE & HOLD 410 to output a positive signal Va amplified in a predetermined level to a first automatic threshold controller (ATC1) 422 and the positive peak value detector 423. Also, the DEMUX & AMP 421 detects only negative (−) values from the signal Vs output from the SAMPLE & HOLD 410 to output a negative signal Vb amplified in a predetermined level to a second automatic threshold controller (ATC2) 424 and the negative peak value detector 425.

The ATC1 422 automatically sets a threshold value Vra of "+1" for detecting a positive peak value in conjunction with the amplified positive signal Va output from the DEMUX & AMP 421, and resets the threshold value Vrb of "−1" to a predetermined value at the time when a negative peak value of an active state (here, logic "1") is detected from the negative peak value detector 425. The positive peak value detector 423 compares the amplified positive signal Va with the positive threshold value set by the ATC1 422 to then output a positive peak value Hn corresponding to the amplified positive signal Va and feed back the positive peak value Hn to the ATC2 424.

The ATC2 424 automatically sets a threshold value Vrb of "−1" for detecting a negative peak value in conjunction with the amplified negative signal Vb output from the DEMUX & AMP 421, and resets the threshold value Vrb of "−1" to a predetermined value at the time when a positive peak value of an active state (here, logic "1") is detected from the positive peak value detector 423. The negative peak value detector 425 compares the amplified negative signal Vb with the negative threshold value set by the ATC2 424 to then output a negative peak value Ln corresponding to the amplified negative signal Vb and feed back the negative peak value Ln to the ATC1 422. The positive peak value Hn of the positive peak value detector 423 and the negative peak value Ln of the negative peak value detector 425 are digital data.

The peak detector 420 having the aforementioned configuration is disclosed in Korean Patent Application No. 97-30468 by the applicant of the present invention. However, the peak detector 420 according to the present invention can employ any configuration that positive and negative values of an input signal are detected by means of a threshold value. Alternatively, a peak detector using ATC is disclosed in an article entitled "Signal processing method PRML, achieving large capacity memory device of the next generation." in Japan Nikkei Electronics No. 599, pp. 72–79, January 1994 by Imai and Miyaki et al. The peak detector disclosed in the above article detects a positive peak value of an input signal since positive and negative peak values of the signal basically correspond to matrices in the case of a binary state number, and makes a provision for detecting the next positive peak value by retaining the detected value for being used as a new threshold value and simultaneously renews the threshold value for detecting a negative peak value. Similarly, the peak detector detects a negative peak value of an input signal, and makes a provision for detecting the next negative peak value by retaining the detected value for being used as a new threshold value and renews the threshold value for detecting a positive peak value. However, this peak detector cannot renew opposite threshold values completely at a desired time. Therefore, there has been proposed a peak detector shown in FIG. 4, for better Viterbi decoding efficiency. Here, ATC means that threshold values are renewed in conjunction with the input signal.

A Viterbi decoder 430 which is a PR(+1, −1) Viterbi decoder receives and Viterbi-decodes the positive peak value Hn and the negative peak value Ln detected from the peak detector 420. The Viterbi decoder 430 can take any kind of a Viterbi decoder using a Viterbi algorithm. Specifically, a Viterbi decoder which does not require an analog-to-digital (A/D) converter can be used. The configuration and operation of an analog Viterbi decoder having a shift register as a chief element is disclosed in U.S. Pat. No. 5,917,863 corresponding to Korean Patent Application No. 96-11620. The analog Viterbi decoder has a simple circuit, compared to a conventional one, which minimizes the area of an integrated circuit, thereby reducing the cost and power consumption. Thus, this decoder is suitable for a small-sized product necessitating low electricity such as a digital video camcorder.

The data decoding apparatus shown in FIG. 4 adopts an analog Viterbi decoder. In the case of adopting a conventional digital Viterbi decoder, the SAMPLE & HOLD 410 must be replaced with an A/D converter.

A channel demodulator 440 having a (1+D) characteristic demodulates Viterbi-decoded data and outputs finally decoded data. Since the output of the Viterbi decoder 430 is digital data, the channel demodulator 440 may be constructed by a D-flipflop by which a delay 442 operates according to driving clock generated in a timing detector 450. An adder 441 may be constructed by an exclusive OR gate. The timing detector 450 detects timing of an equalized reproduction signal to output driving clock necessary for the SAMPLE & HOLD 410, the Viterbi decoder 430 and the channel demodulator 440.

Figure 1:
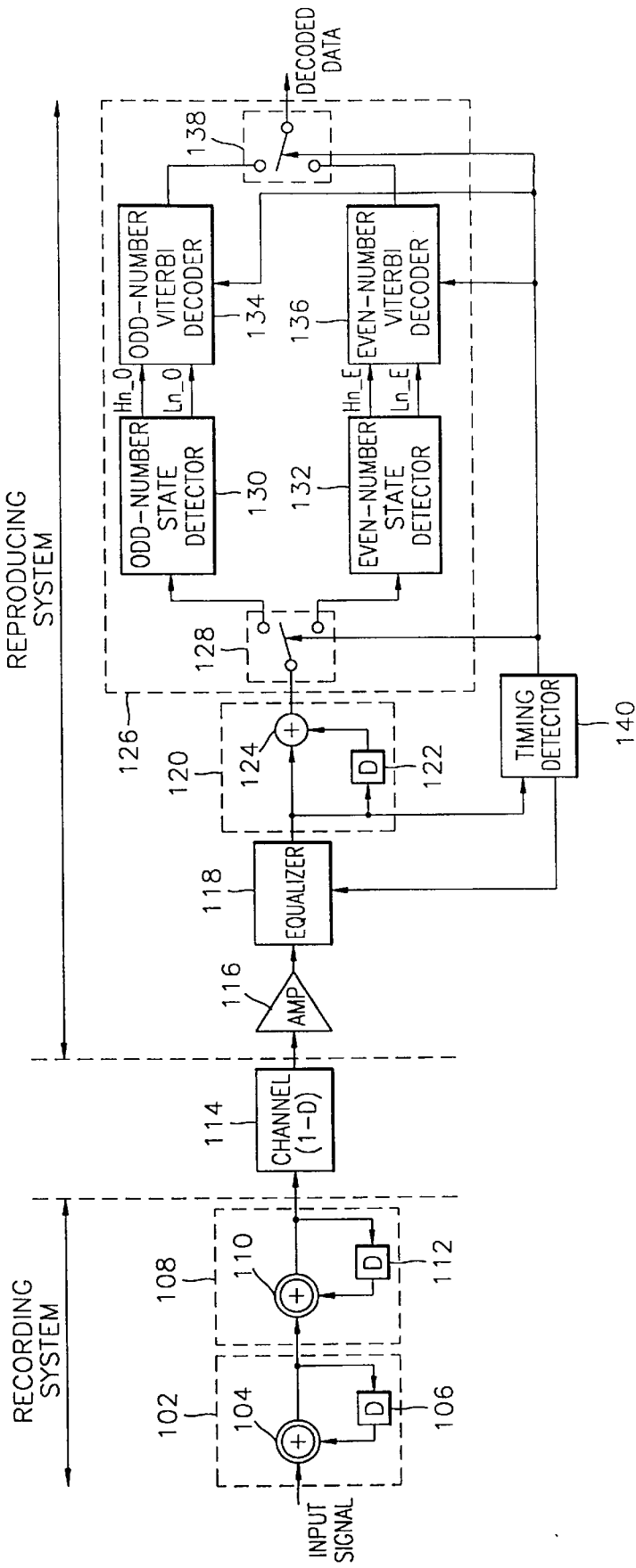
FIG. 1 is a block diagram of a conventional digital video cassette recorder having a PR4 channel.

The data decoding apparatus shown in FIG. 4 Viterbi-decodes the PR(+1, −1) signal whose channel is not demodulated without decoding the PR4(+1, 0, −1) signal demodulated by the channel demodulator, in contrast with that shown in FIG. 1. Thus, the peak detector 420 and the Viterbi decoder 430 can be comprised of only a single channel. The output of the Viterbi decoder 430 is demodulated by the channel demodulator 440 having the (1+D) characteristic and then finally decoded data is output.

However, since the data decoding apparatus shown in FIG. 4 detects peaks prior to channel demodulation using the (1+D) characteristic, when much noise is overlapped with the reproduction signal, errors in the positive peak value Hn and the negative peak value Ln output from the peak detector 420 are increased, thereby lowering the overall performance of the data decoding apparatus. Therefore, the data decoding apparatus shown in FIG. 4 can be adopted for a recording/reproducing apparatus having a PR4 channel strong against noise. Particularly, if the noise overlapped with the reproduction signal is a negligible level that cannot affect the desired performance of the decoded data, the apparatus shown in FIG. 4 will have remarkable competitiveness in view of implementation simplicity and cost.

However, since many factors involve in generating noise in a magnetic recording/reproducing apparatus using a magnetic head or a magnetic tape as a channel, the level of the noise overlapped with the reproduction signal is not usually negligible. It is important to decrease the noise level in determining the data decoding efficiency.

Here, the main causes of generating the noise include the property of tape particles, head impedance and initial bias resistance of a reproducing amplifier. Also, since the viterbi decoder is reached after passing through various processors including a reproducing head, reproducing amplifier and equalizer, the spectrum of the input signal varies.

Figure 5:
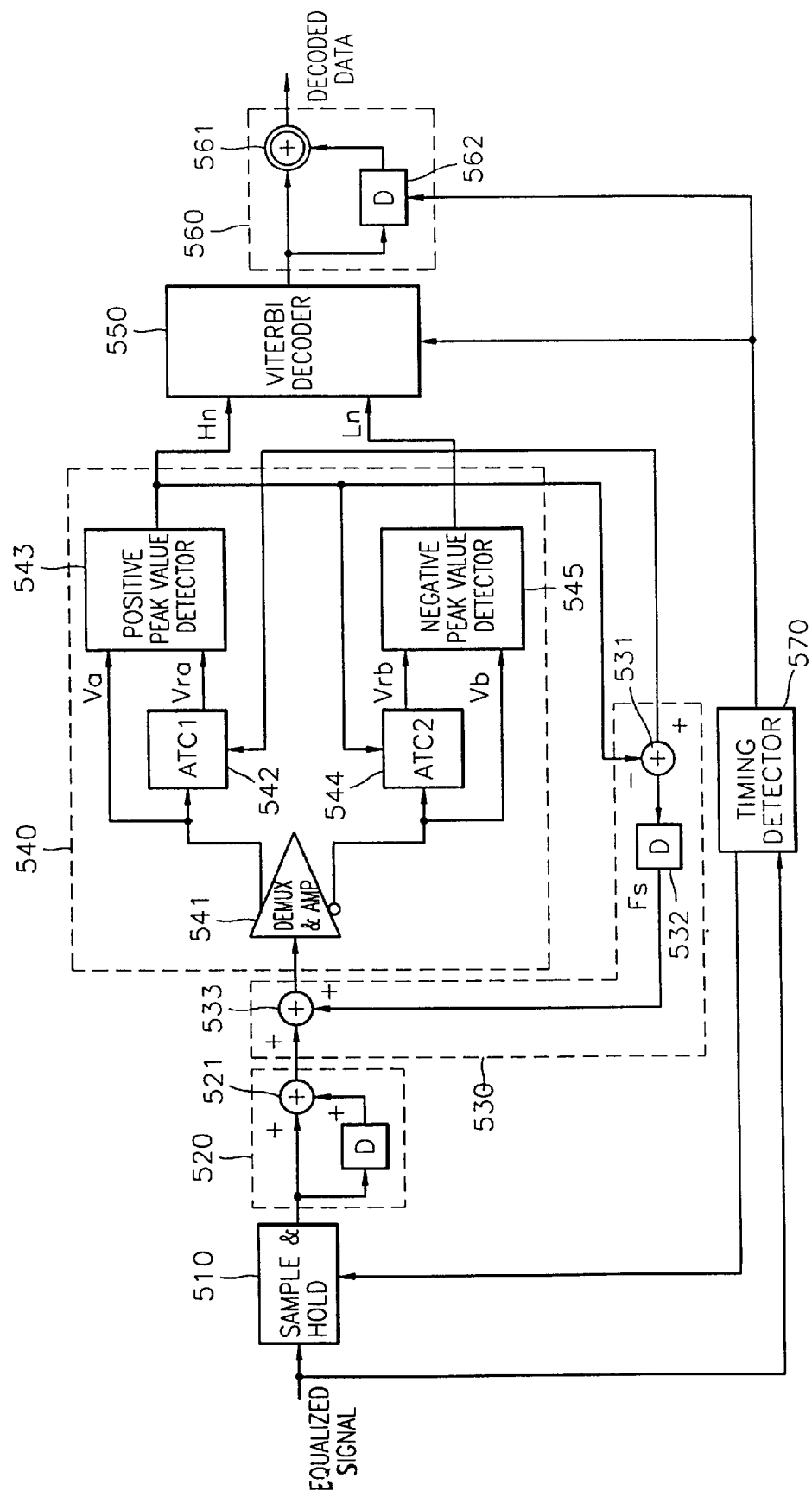
FIG. 5 is a block diagram of a data decoding apparatus according to another embodiment of the present invention.

FIG. 5 shows a data decoding apparatus comprised of one channel state detector and Viterbi decoder, capable of solving such a noise problem. A SAMPLE & HOLD 510, a peak detector 540 as an example of a state detector, a channel demodulator 560 and a timing detector 570 shown in FIG. 5 are the same as the corresponding elements shown in FIG. 4, and the detailed operation thereof will not be explained herein.

In FIG. 5, a pre-filter 520 having a (1+D) characteristic delays the output signal Vs of the SAMPLE & HOLD 510 by a period D corresponding to one bit of recorded data and adds the delayed signal with the output signal Vs of the SAMPLE & HOLD 510 in an adder 521. Since the pre-filter 520 serves as a low-pass filter, the noise characteristic is improved, but the aperture ratio of an eye pattern is decreased. The pre-filter 520 converts a PR(+1, −1) signal into a PR4(+1, 0, −1) signal.

An inverse pre-filter 530 has a 1/(1+D) characteristic which is an inverted characteristic of the pre-filter 520. A subtractor 531 subtracts a positive peak value Hn output from a positive peak value detector 543 from a negative peak value Ln output from a negative peak value detector 545 in a peak detector 540. The subtraction result is delayed by a delay 532 by a period D corresponding to one bit of recorded data and then a feed-back signal Fs is fed back to an adder 533. The adder 533 adds the output of the pre-filter 520 and the feed-back signal Fs to output the result to the peak detector 540. At this time, the feed-back signal Fs is a signal having a negative value.

Here, the PR4(+1, 0, −1) signal output from the pre-filter 520 is again converted into the original PR(+1, −1) signal according to a (1+D) characteristic of the inverse pre-filter 530 to allow data decoding using only the peak detector 540 and the Viterbi decoder 550. In view of the noise problem, since the digital-state output of the peak detector 540 is fed back and the adder 533 adds the feed-back signal Fs with the analog output signal of the pre-filter 520 having a digital form, the noise level is almost the same as that in the conventional PR4 system having a channel demodulator in front of the state detectors and the Viterbi decoders. In other words, the data decoding apparatus shown in FIG. 5 can obtain a reproduction output corresponding to a noise characteristic of the PR4(+1, 0, −1) system and corresponding to an aperture ratio of the PR(+1, −1) system. Thus, the performance of the Viterbi decoder is improved and the structure thereof is simplified, thereby becoming sufficiently competitive.

Figure 6:
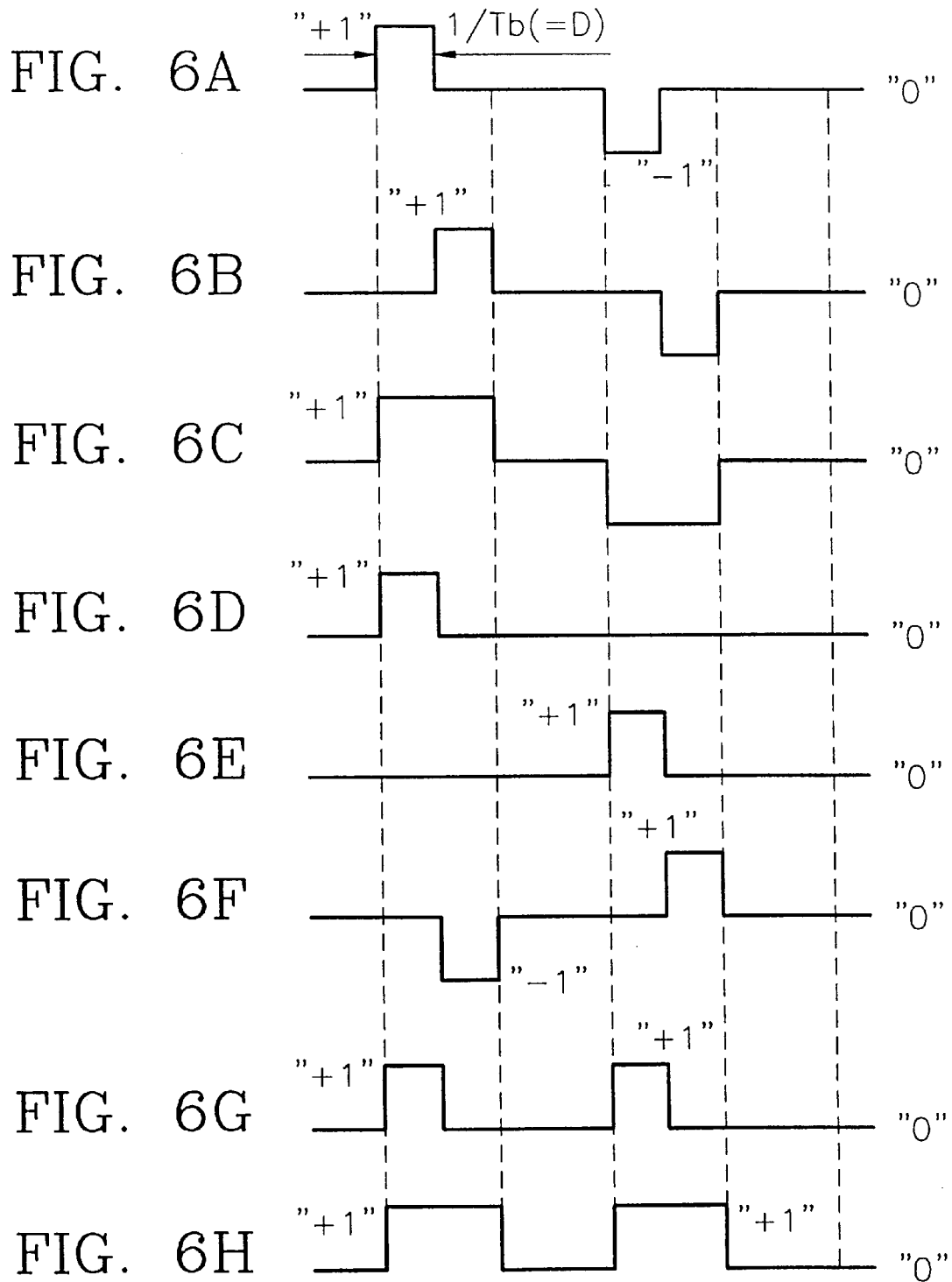
FIGS. 6A through 6H are operational waveform diagrams of the data decoding apparatus shown in FIG. 5.

FIGS. 6A through 6H are operational waveform diagrams of the data decoding apparatus shown in FIG. 5. FIG. 6A shows a waveform of an output signal Vs of the SAMPLE & HOLD 510, and FIG. 6B shows a waveform of a signal obtained by delaying the output signal Vs of the SAMPLE & HOLD 510 by a one-bit period D of recorded data by the delay 522 of the pre-filter 520. FIG. 6C shows a waveform of an output of the adder 521 of the pre-filter 520, FIG. 6D shows a waveform of a positive peak value Hn output from the positive peak value detector 543 of the peak detector 540, FIG. 6E shows a waveform of a negative peak value Ln output from the negative peak value detector 545, and FIG. 6F shows a waveform of a feed-back signal Fs output from the delay 532 of the inverse pre-filter 530. FIG. 6G shows a waveform of a Viterbi-decoded data output from the Viterbi decoder 550, and FIG. 6H shows a waveform of a finally decoded data output from the channel demodulator 560.

Figure 7:
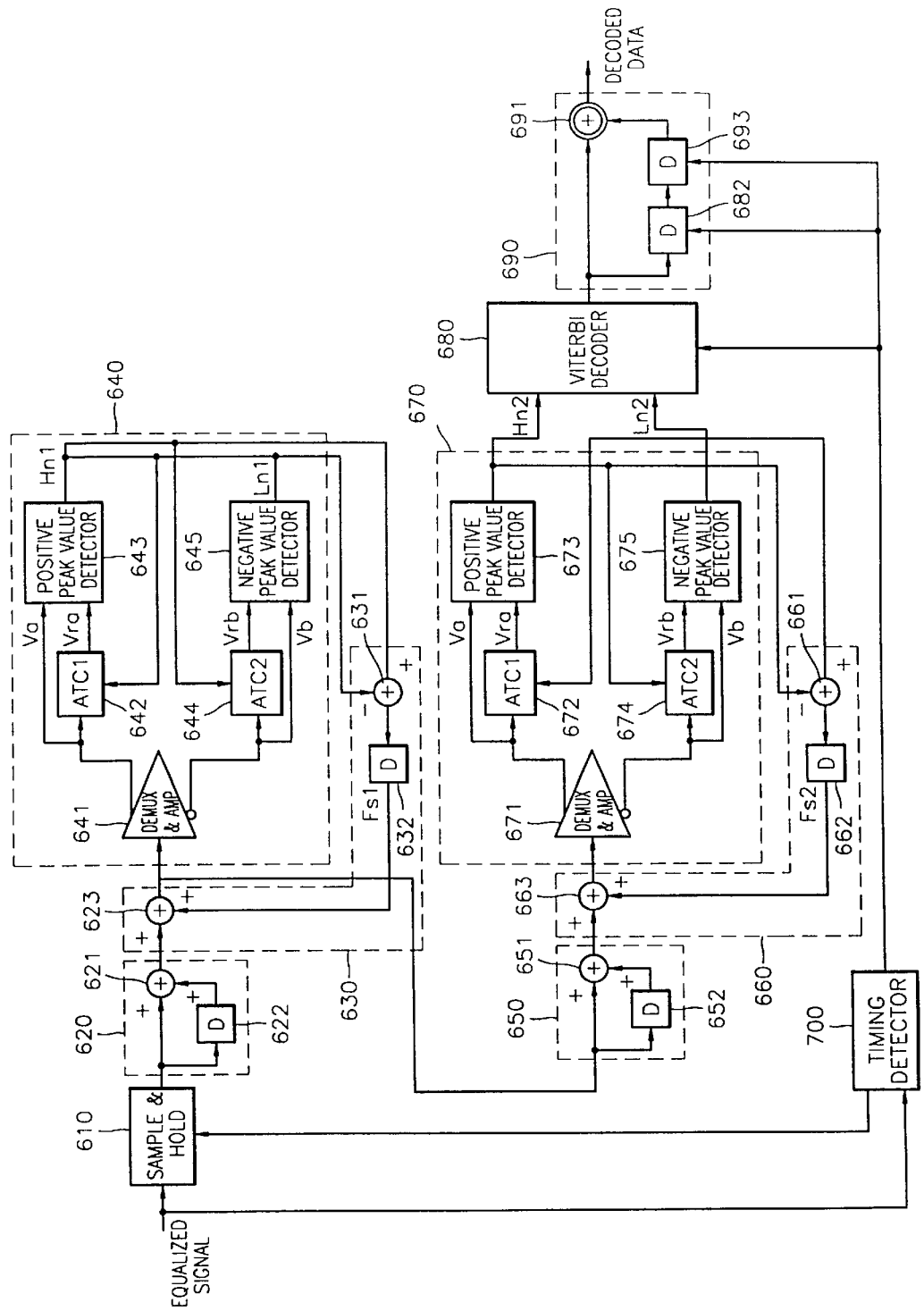
FIG. 7 is a block diagram of a data decoding apparatus according to still another embodiment of the present invention.

FIG. 7 is a block diagram of a data decoding apparatus which can be adopted to a digital recording/reproducing apparatus having an $E^nPR4$ channel. For the convenience' sake of explanation, an EPR4 mode will be described as an example. The explanation of the same elements as those shown in FIG. 5 will be omitted herein.

Figure 2:
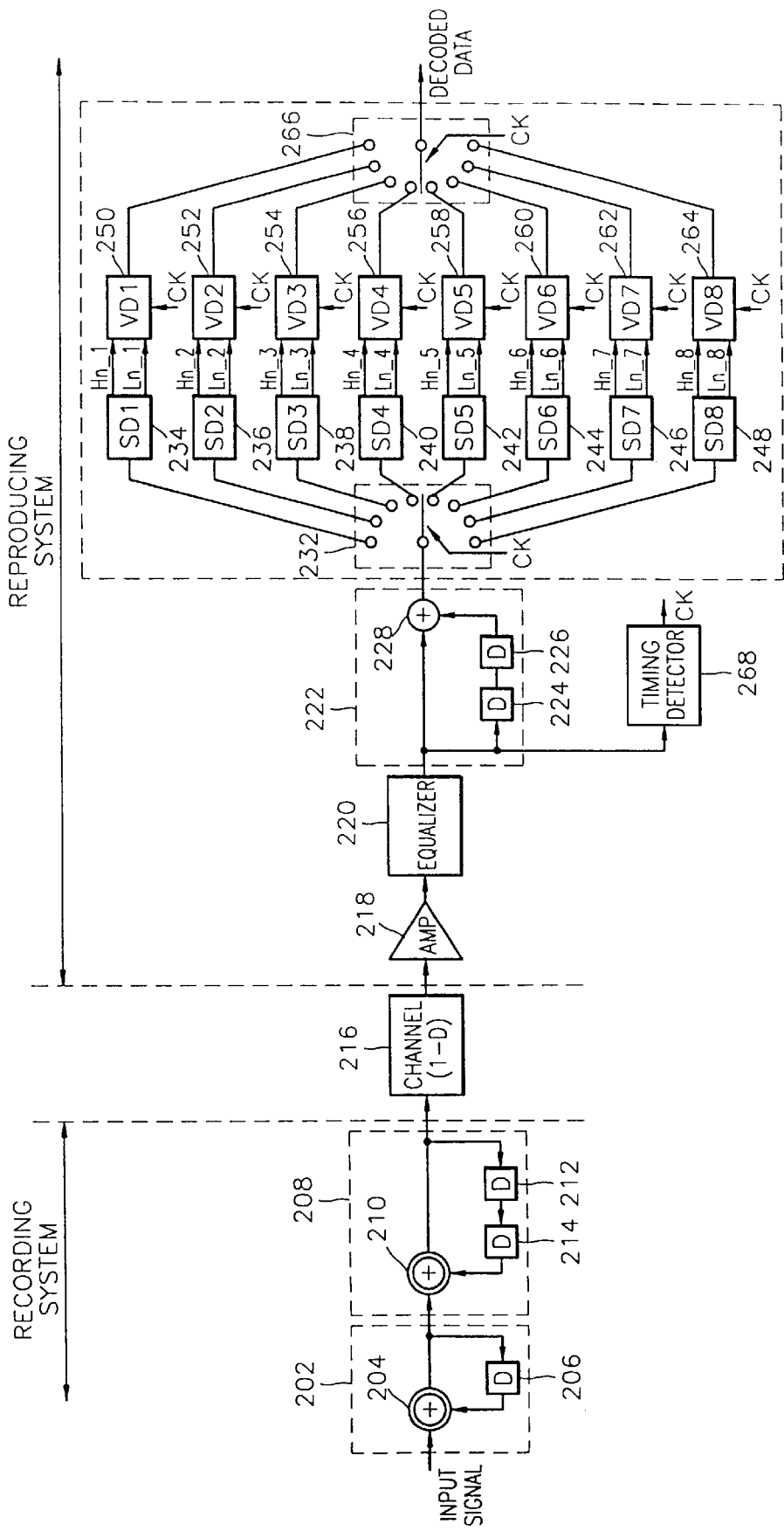
FIG. 2 is a block diagram of a conventional digital recording/reproducing apparatus having an EPR4 channel.
Figure 3:
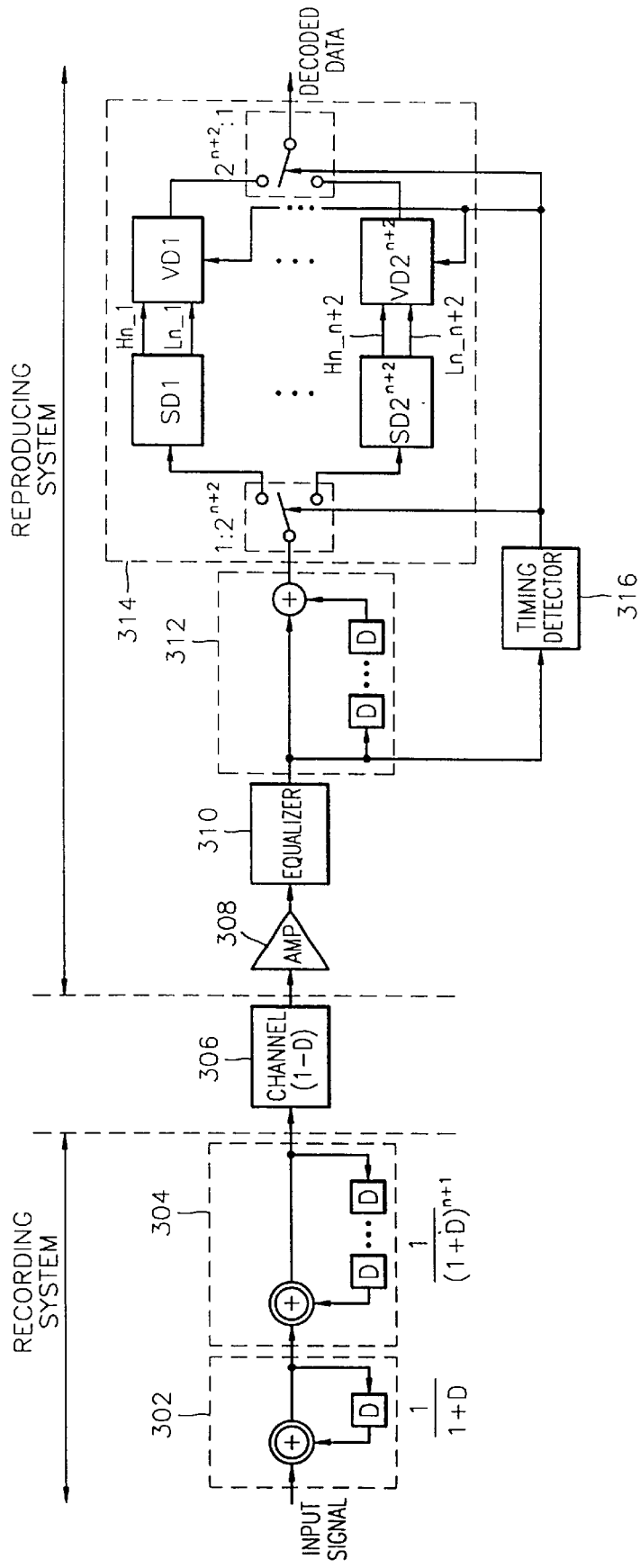
FIG. 3 is a block diagram of a conventional digital recording/reproducing apparatus having an $E^n$PR4 channel.

The main difference between the system of the present invention and the conventional EPR4 system shown in FIG. 2 lies in the fact that the former is comprised of a 1-state detector and a Viterbi decoder and the latter is comprised of 8 ($2^3$) state detectors and 8 Viterbi decoders. Also, a channel demodulator 690 is disposed in the rear end of the Viterbi decoder 680 to have a $(1+D)^2$ characteristic to correspond to the precoder of the EPR4 system, having a $1/(1+D)^2$ characteristic.

The data decoding apparatus according to the present invention includes a first pre-filter 620 having a (1+D) characteristic to cope with the noise characteristic of the EPR4 system, a first inverse pre-filter 630 having a 1/(1+D) characteristic which is inverse to that of the pre-filter 620, a first peak detector 640 for detecting a positive peak value and a negative peak value from the output of the first inverse pre-filter 630 to feed back the same to the first inverse pre-filter 630, a second pre-filter 650 for converting the output of the first inverse pre-filter 630 into a PR4(+1, 0, −1) signal, a second inverse pre-filter 660 for converting the output of the second pre-filter 650 into a PR(+1, −1) signal, and a second peak detector 670 for detecting a positive peak value and a negative peak value from the output of the second inverse pre-filter 660 to feed back the same to the second inverse pre-filter 660. Thus, the data decoding apparatus employs a one-channel Viterbi decoder such that the signal input to the Viterbi decoder 680 is made to take a PR(+1, −1) form while maintaining the noise level of the EPR4 system by using two pre-filters 620 and 650 and two inverse pre-filters 630 and 660.

Here, the data decoding apparatus adopted to the digital recording/reproducing apparatus having an $E^nPR4$ channel includes n+1 pre-filters having a (1+D) characteristic, n+1 inverse pre-filters having a 1/(1+D) characteristic, and a channel demodulator having a $(1+D)^{n+1}$ characteristic in the rear end of a Viterbi decoder.

Since the data decoding apparatus according to the present invention, adopted to an $E^nPR4$ system has a magnetic channel having a (1−D) characteristic, the output thereof takes a PR(1, −1) signal form, which meets a requirement of a Viterbi decoding algorithm. Thus, the goal of the present invention is to use a one-channel Viterbi decoder using this reproduction signal as a decoding signal without being converted into another form signal.

In this case, conventionally, since the signal does not pass through the channel demodulator having a lowpass filter characteristic, i.e., $(1+D)^{n+1}$, the effect of noise is severe, which lowers the efficiency of the decoding apparatus. However, according to the present invention, the output signal of a peak detector, having digital information, is fed back and a inverse pre-filter for adding the output signal of the peak detector to that of a pre-filter having a lowpass filter characteristic (1+D) is constructed in front of a Viterbi decoder, thereby improving the noise level to a level of the EPR4(1, 1, −1, −1) system while maintaining the signal of the data decoding apparatus as a PR(+1, −1) state. Thus, the data decoding apparatus in a recording/reproducing system having a magnetic channel can be very easily implemented.

Also, according to the present invention, as shown in FIGS. 5 and 7, the data decoding apparatus can be constructed to cope with only the system of a PR4 mode or an $E^nPR4$ mode. Otherwise, as shown in FIG. 8, the data decoding apparatus can be constructed to cope with various type systems.

Figure 8:
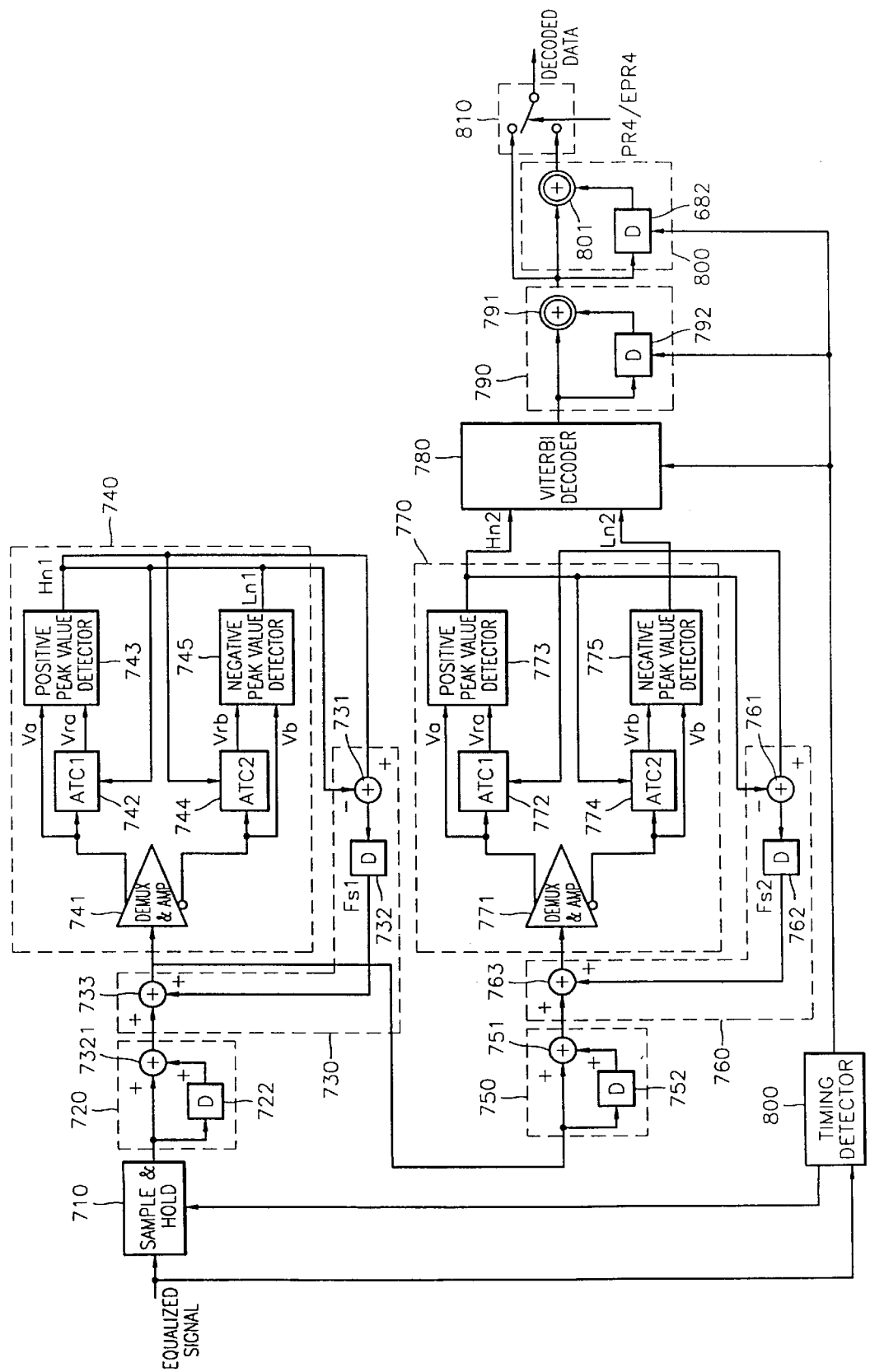
FIG. 8 is a block diagram of a data decoding apparatus according to still yet another embodiment of the present invention.

FIG. 8 is a block diagram of a data decoding apparatus having a PR4 channel which can selectively reproduce a signal into a PR4 signal or an EPR4 signal, in which the same elements as those shown in FIG. 7 will not explained in detail. For the convenience' sake of explanation, an EPR4 mode will be described as an example of an $E^nPR4$ mode.

In FIG. 8, a first inverse pre-filter 730 converts the output signal of a first pre-filter, being a PR4(1, 0, −1) mode, into a PR(+1, −1) mode signal. A second pre-filter 750 and a second inverse pre-filter 760 are constructed in the same manner as the first pre-filter 720 and the first inverse pre-filter 730, to cope with an EPR4 decoder.

A first channel demodulator 790 has a (1+D) characteristic and the output thereof is decoded data for a PR4 system to be input to a first input port of a selector 810. A second channel demodulator 800 connected to an output port of the first channel demodulator 790 has a (1+D) characteristic and the output thereof is decoded data for an EPR4 system to be input to a second input port of the selector 810. The selector 810 selects the output of the first channel demodulator 790 if the signal is a PR4 mode signal, and selects the output of the second channel demodulator 800 if the signal is an EPR4 mode signal, according to a mode signal PR4/EPR4.

Therefore, if data is decoded by the EPR4 system shown in FIG. 8 in a digital recording/reproducing apparatus having a PR4 channel, noise characteristics are improved and the aperture ratio of an eye pattern is also increased. Thus, the present invention can be applied to a system which requires excellent decoding efficiency.

Also, referring to FIG. 8, in the digital recording/reproducing apparatus having a PR4 channel, data decoding is selectively performed in a PR4 mode or an EPR4 mode. Here, by adding a precoder and a inverse pre-filter, data decoding can be selectively performed in various types such as $E^2PR$, $E^3PR$ and $E^4PR$. Also, data decoding can be performed by constructing pre-filters and inverse pre-filters more than n+1 in a digital recording/reproducing apparatus having an $E^nPR4$ channel, thereby improving noise characteristics and increasing the aperture ratio of an eye pattern.

FIGS. 9A through 9L are operational waveform diagrams of the data decoding apparatus shown in FIG. 8, illustrating a process of decoding a reproduction signal input to the Viterbi decoder 780 in the case when no noise is overlapped with a channel.

Figure 9A:
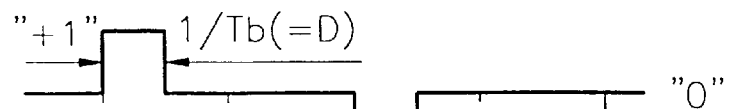
Figure 9B:
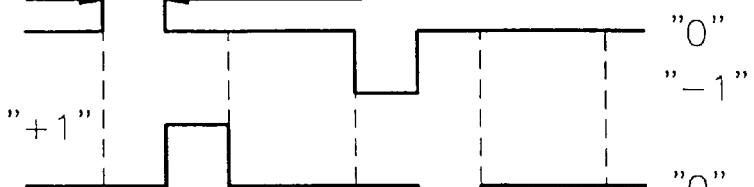
Figure 9D:
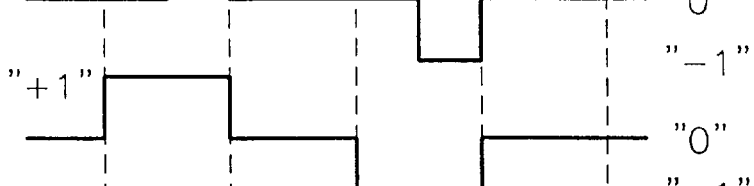

In detail, FIG. 9A shows a waveform of a signal Vs output from the SAMPLE & HOLD 710, FIG. 9B shows a waveform of a signal produced by delaying the signal Vs output from the SAMPLE & HOLD 710 by the delay 722 of the first pre-filter 720, FIG. 9C shows a waveform of an output signal of the first pre-filter 720, and FIG. 9D shows a waveform of a feed-back signal Fs1 output from the delay 732 of the first inverse pre-filter 730. The feed-back signal Fs1 is detected from the output signal of the peak detector 740. Thus, this signal is a signal converted into a digital level. Since the feed-back signal Fs1 does not includes analog noise, the first inverse pre-filter 730 can perform a 1/(1+D) operation without increasing noise.

Figure 9E:
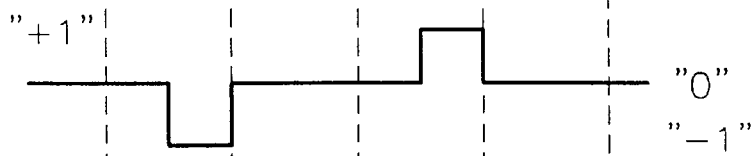
Figure 9F:
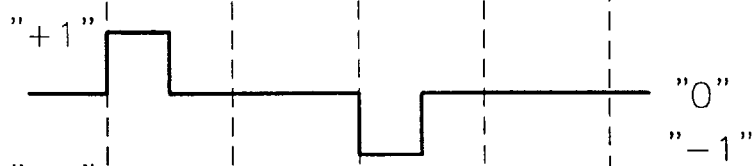
Figure 9G:
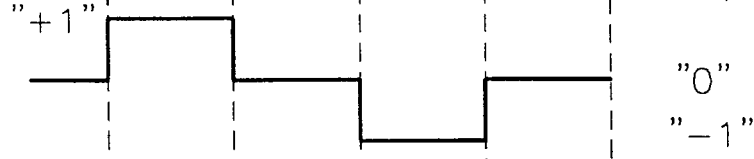
Figure 9H:
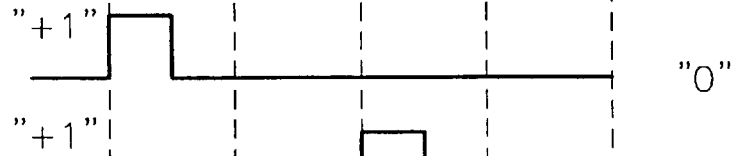

FIG. 9E shows a waveform of an output signal of the first inverse pre-filter 730, FIG. 9F shows a waveform of a signal produced by delaying the output of the first inverse pre-filter 730 by the delay 752 of the second pre-filter 750, FIG. 9G shows a waveform of a positive peak value Hn output from the second positive peak value detector 773, and FIG. 9H shows a waveform of a negative peak value output from the second negative peak value detector 775.

Figure 9I:
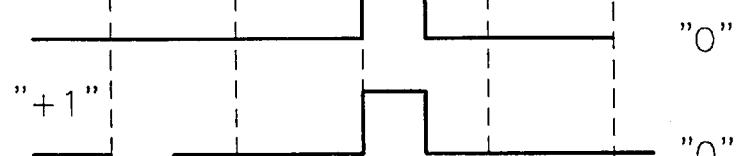
Figure 9J:
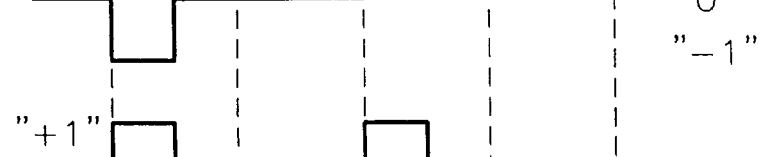
Figure 9K:
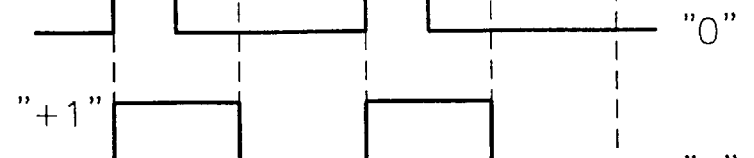
Figure 9L:
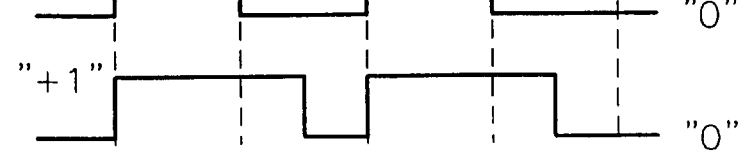

FIG. 9I shows a waveform of a feed-back signal Fs2 output from the delay 762 of the second inverse pre-filter 760, FIG. 9J shows a waveform of decoded data output from the Viterbi decoder 780, FIG. 9K is a waveform of an output signal of the first channel demodulator 790, and FIG. 9L shows a waveform of an output signal of the second channel demodulator 800.

According to the present invention, in a system having a PR4(+1, 0, −1) channel such as a digital magnetic recording/reproducing apparatus, when a reproduction signal is decoded by a Viterbi decoding method, the system is constructed such that the noise level corresponds to that of a PR4(+1, 0, −1) system and the aperture ratio of an eye pattern corresponds to that of a PR(+1, −1) system. Thus, a state detector and a Viterbi decoder are constructed into one channel, such that the efficiency of the Viterbi decoder is improved, compared to that of a PR4(+1, 0, −1) system, and state detection is allowed by a PR(+1, −1) system. In other words, remarkable competitiveness can be secured in view of easy implementation and manufacturing cost.

Also, in a system having an E″PR4 channel such as a digital magnetic recording/reproducing apparatus, when a reproduction signal is decoded by a Viterbi decoding method, the system is constructed such that the noise level corresponds to that of an E″PR4 system and the aperture ratio of an eye pattern corresponds to that of a PR(+1, −1) system. Thus, a Viterbi decoder comprised of one channel is constructed, such that the efficiency of the Viterbi decoder is improved and state detection is allowed by the PR(+1, −1) system. In other words, remarkable competiveness can be secured in view of easy implementation and manufacturing cost.

Further, the present invention has an effect of selectively decoding data in various types in addition to each type in a system having a PR4 channel or an E″PR4 channel.

What is claimed is:
1. A data decoding apparatus in a recording/reproducing system having a PR4 channel including a precoder having a 1/(1+D) characteristic, wherein D is a delay period corresponding to one bit of recorded data, the data decoding apparatus comprising:
   a pre-filter having a (1+D) characteristic, for converting a PR(+1, −1) signal received through said PR4 channel into a PR4(+1, 0, −1) signal;
   an inverse pre-filter having a 1/(1+D) characteristic, for converting the PR4(+1,0,−1) signal received through said PR4 channel into a PR(+1,−1) signal again;
   a maximum likelihood decoder having only a single channel, for maximum-likelihood-decoding the PR(+1, −1) signal output from said inverse pre-filter to generate maximum-likelihood-decoded data; and
   a channel demodulator having a (1+D) characteristic, which is an inverse characteristic of said precoder, for channel-demodulating said maximum-likelihood-decoded data to generate decoded data.

2. The data decoding apparatus of claim 1, wherein said maximum likelihood decoder comprises:
   a state detector for detecting positive and negative state values of the PR(+1, −1) signal according to positive and negative threshold values varying according to the PR(+1, −1) signal; and
   a Viterbi decoder for receiving and Viterbi-decoding the positive and negative state values detected by said state detector.

3. The data decoding apparatus of claim 2, wherein said pre-filter comprises:
   a first delay for delaying the PR(+1, −1) signal received through said PR4 channel by a unit value to generate a delayed signal; and
   a first adder for adding the delayed signal to the PR(+1, −1) signal received through said PR4 channel to generate a first addition signal of a PR4(+1, 0, −1) mode.

4. The data decoding apparatus of claim 3, wherein said inverse pre-filter comprises:
   a subtractor for subtracting the positive state value from the negative state value;
   a second delay for delaying the output of said subtractor by a unit value to generate a feed-back signal; and
   a second adder for adding the first addition signal to the feed-back signal to generate the PR(+1, −1) signal.

5. The data decoding apparatus of claim 1, further comprising:
   a sample and hold circuit for sampling and holding the PR(+1, −1) signal received through said PR4 channel; and
   a timing detector for detecting the timing of the PR(+1, −1) signal received through said channel to generate a driving clock which is provided to said sample and hold circuit, said maximum likelihood decoder and said channel demodulator.

6. The data decoding apparatus of claim 1, further comprising:
   an analog-to-digital (A/D) converter for converting the PR(+1, −1) signal received through said channel into digital data; and
   a timing detector for detecting the timing of the PR(+1, −1) signal received through said channel to generate driving clock which is provided to said maximum likelihood decoder and said channel demodulator.

7. The data decoding apparatus of claim 1, wherein said channel demodulator comprises:
   a D flip-flop for unit delaying the maximum likelihood decoded data by a unit value; and
   an XOR logic circuit for performing an XOR operation on the maximum likelihood decoded data and an output of said D flip-flop.

8. A data decoding apparatus in a recording/reproducing system having an E″PR4 channel including a precoder having a $1/(1+D)^{n+1}$ characteristic, wherein D is a delay period corresponding to one bit of recorded data and n equals the number of D delay periods of the precoder, the data decoding apparatus comprising:
   a first pre-filter having a (1+D) characteristic, for converting a PR(+1, −1) signal received through said E″PR4 channel into a PR4(+1, 0, −1) signal;
   a state detector for detecting positive and negative state values of the PR(+1, −1) signal depending on positive and negative threshold values varying according to the PR(+1, −1) signal;

a first inverse pre-filter having a 1/(1+D) characteristic, for feed-back receiving the positive and negative state values detected by said state detector and converting the PR4(+1, 0, −1) signal into the PR(+1, −1) signal which is provided to said state detector, said state detector and said first inverse pre-filter being connected in series;

a Viterbi decoder having a single channel, for receiving and Viterbi-decoding the positive and negative state values detected by said state detector to generate Viterbi-decoded data; and a channel demodulator having a $(1+D)^{n+1}$ characteristic, which is an inverse characteristic of said precoder, for channel-demodulating the Viterbi decoded data to generate decoded data.

9. The data decoding apparatus of claim 8, further comprising second through (n+1)th pre-filters having a (1+D) characteristic and second through (n+1)th inverse pre-filters having a 1/(1+D) characteristic, wherein said first pre-filter comprises:

a first delay for delaying the PR(+1, −1) signal by a unit value to generate a first delayed signal; and a first adder for adding the PR(+1, −1) signal to said first delayed signal to generate a first addition signal of a PR4(+1, 0, −1) mode, and wherein said second through (n+1)th pre-filters each comprises:

a second delay for unit-delaying the PR(+1, −1) signal output from a previous inverse pre-filter by a unit period to generate a delayed signal; and a second adder for adding the PR(+1, −1) signal output from the previous inverse pre-filter by a unit period to said delayed signal to generate a PR4(+1, 0, −1) signal.

10. The data decoding apparatus of claim 8, wherein said first inverse pre-filter comprises:

a subtractor for subtracting the positive state value from the negative state value output from said state detector;

a second delay for delaying the output of said subtractor by a unit value to generate a feed-back signal; and a second adder for adding the output signal of said pre-filter to the feed-back signal.

11. The data decoding apparatus of claim 8, further comprising:

a sample and hold circuit for sampling and holding the PR(+1, −1) signal received through said channel; and a timing detector for detecting the timing of the PR(+1, −1) signal received through said channel to generate a driving clock which is provided to said sample and hold circuit, said Viterbi decoder and said channel demodulator.

12. The data decoding apparatus of claim 8, further comprising:

an analog-to-digital (A/D) converter for converting the PR(+1, −1) signal received through said channel into digital data; and a timing detector for detecting the timing of the PR(+1, −1) signal received through said channel to generate a driving clock which is provided to said Viterbi decoder and said channel demodulator.

13. The data decoding apparatus of claim 8, wherein said channel demodulator comprises:

n+1 delays connected in series, for (n+1) bit-delaying the Viterbi decoded data; and an XOR logic circuit for performing an XOR operation on the Viterbi decoded data and output signals of said n+1 delays.

14. A data decoding apparatus in a recording/reproducing system having a PR4 channel including a precoder having a 1/(1+D) characteristic, wherein D is a delay period corresponding to one bit of recorded data, the data decoding apparatus comprising:

a first pre-filter having a (1+D) characteristic, for converting a PR(+1, −1) signal received through said channel into a PR4(+1, 0, −1) signal;

a state detector for detecting positive and negative state values depending on positive and negative threshold values varying according to the PR(+1, −1) signal;

a first inverse pre-filter having a 1/(1+D) characteristic, for feed-back receiving the positive and negative state values detected by said state detector, converting again the PR4(+1, 0, −1) signal into the PR(+1, −1) signal and outputting the converted signal to said state detector, said state decoder and said inverse pre-filter being connected in series;

a Viterbi decoder having a single channel, for receiving and Viterbi-decoding the positive and negative state values detected by said state detector to generate Viterbi-decoded data; and a first channel demodulator having a (1+D) characteristic which is an inverse characteristic of said precoder, for channel-demodulating the Viterbi-decoded data to output decoded data of a PR4 mode;

a second channel demodulator having a $(1+D)^n$ characteristic, for channel-demodulating the output of said first channel demodulator to output decoded data of an $E^n$PR4 mode; and a selector for selecting one of the outputs of said first and second channel demodulators according to a PR4/$E^n$PR4 mode signal.

15. The data decoding apparatus according to claim 14 further comprising second through (n+1)th pre-filters having a (1+D) characteristic and second through (n+1)th inverse pre-filters having a 1/(1+D) characteristic, wherein said first pre-filter comprises:

a first delay for delaying the PR(+1, −1) signal by a unit value to generate a first delayed signal; and a first adder for adding the PR(+1, −1) signal to said first delayed signal to generate a first addition signal of a PR4(+1, 0, −1) mode, and wherein said second through (n+1)th pre-filters each comprises:

a second delay for unit-delaying the PR(+1, −1) signal output from a previous inverse pre-filter by a unit period to generate a delayed signal; and a second adder for adding the PR(+1, −1) signal output from the previous inverse pre-filter by a unit period to said delayed signal to generate the PR4(+1, 0, −1) signal.

16. The data decoding apparatus of claim 14, wherein said first inverse pre-filter comprises:

a subtractor for subtracting the positive state value from the negative state value output from said state detector;

a second delay for delaying the output of said subtractor by a unit value to generate a feed-back signal; and a second adder for adding the output signal of said pre-filter to the feed-back signal.

17. The data decoding apparatus of claim 14, further comprising:
  a sample and hold circuit for sampling and holding the PR(+1, −1) signal received through said channel; and
  a timing detector for detecting the timing of the PR(+1, −1) signal received through said channel to generate a driving clock which is provided to said sample and hold circuit, said Viterbi decoder and said channel demodulator.

18. The data decoding apparatus of claim 14, further comprising:
  an analog-to-digital (A/D) converter for converting the PR(+1, −1) signal received through said channel into digital data; and
  a timing detector for detecting the timing of the PR(+1, −1) signal received through said channel to generate a driving clock which is provided to said Viterbi decoder and said channel demodulator.

19. The data decoding apparatus of claim 14, wherein said first channel demodulator comprises:
  a unit delay for delaying the Viterbi decoded data by a unit value; and
  an XOR logic circuit for performing an XOR operation on the Viterbi decoded data and an output signal of said unit delay.

20. The data decoding apparatus of claim 14, wherein said second channel demodulator comprises:
  n delays serially connected for n-bit delaying the output of said first channel demodulator; and
  an XOR logic circuit for performing an XOR operation on the outputs of said first channel demodulator and output signals of said n delays.

21. A data decoding apparatus in a recording/reproducing system having an $E^nPR4$ channel including a precoder having a $1/(1+D)^{n+1}$ characteristic, wherein D is a delay period corresponding to one bit of recorded data and n equals the number of D delay periods of the precoder, the data decoding apparatus comprising:
  a pre-filter having a (1+D) characteristic, for converting a PR(+1, −1) signal received through said channel into a PR4(+1, 0, −1) signal;
  a state detector for detecting positive and negative state values of the PR(+1, −1) signal depending on positive and negative threshold values varying according to the PR(+1, −1);
  an inverse pre-filter for feed-back receiving the positive and negative state values, converting again the PR4(+1, 0, −1) signal into the PR(+1, −1) signal and outputting the converted signal to said state detector, said state decoder and said inverse pre-filter being connected in series;
  a Viterbi decoder having a single channel, for receiving and Viterbi-decoding the positive and negative state values detected by said state detector to generate Viterbi-decoded data; and
  a first channel demodulator having $1/(1+D)^{n+1}$ characteristic, which is an inverse characteristic of said precoder, for channel-demodulating the Viterbi-decoded data to output first decoded data;
  a second channel demodulator having a $(1+D)^p$ (p=m−n−1) characteristic, for channel-demodulating the output of said first channel demodulator to output second decoded data; and
  a selector for selecting the first decoded data or said second decoded data in accordance with a mode signal.

22. A data decoding method in a system having a PR4 channel including a precoder having a 1/(1+D) characteristic, said method comprising the steps of:
  (a) delaying a PR(+1, −1) signal received through said PR4 channel to generate delayed data having a (1+D) characteristic, adding the delayed signal to the PR(+1, −1) signal to generate a PR(+1, 0, −1) signal;
  (b) subtracting the PR4(+1, 0, −1) signal from a feed-back signal to generate a PR(+1, −1) signal;
  (c) detecting positive and negative state values of the PR(+1, −1) signal depending on positive and negative threshold values varying according to the PR(+1, −1) signal generated in said (b) step, and outputting the feed-back signal obtained by adding the positive state value to the negative state value;
  (d) receiving the positive and negative state values and Viterbi-decoding the same to output Viterbi-decoded data; and
  (e) delaying the Viterbi-decoded data to have a (1+D) characteristic, which is an inverse characteristic of said precoder, and adding the delayed data to the Viterbi-decoded data to generate decoded data.

23. A data decoding method in a system having an $E^nPR4$ channel including a precoder having a $1/(1+D)^{n+1}$ characteristic, wherein D is a delay period corresponding to one bit of recorded data and n equals the number of D delay periods of the precoder, said data decoding method comprising the steps of:
  (a) unit-bit delaying a PR(+1, −1) signal received through said $E^nPR4$ channel to generate a delayed signal having a (1+D) characteristic, and adding the delayed signal to the PR(+1, −1) signal to generate a PR4(+1, 0, −1) signal;
  (b) subtracting the PR4(+1, 0, −1) signal from a feed-back signal to generate a PR(+1, −1) signal;
  (c) detecting positive and negative state values of the PR(+1, −1) signal depending on positive and negative threshold values varying according to the PR(+1, −1) signal generated in said (b) step, and generating the feed-back signal by adding the positive state value to the negative state value;
  (d) repeating said step (a) through step (c) (n+1)-times;
  (e) Viterbi-decoding the PR(+1, −1) signal after performing said (d) step to generate Viterbi decoded data; and
  (f) delaying the Viterbi decoded data by (n+1)-bits and adding the delayed Viterbi decoded data to the Viterbi-decoded data to generate decoded data having a $(1+D)^{n+1}$ characteristic which is an inverse characteristic of said precoder.

24. A data decoding method in a system having a PR4 channel including a precoder having a 1/(1+D) characteristic, wherein D is a delay period corresponding to one bit of recorded data, said data decoding method comprising the steps of:
  (a) unit-bit delaying a PR(+1, −1) signal received through said PR4 channel to generate a delayed signal having a (1+D) characteristic, and adding the delayed signal to the PR(+1, −1) signal to generate a PR(+1, 0, −1) signal;
  (b) subtracting the PR(+1, 0, −1) signal from a feed-back signal to generate a PR(+1, −1) signal;
  (c) detecting positive and negative state values of the PR(+1, −1) signal depending on positive and negative threshold values varying according to the PR(+1, −1) signal generated in said step (b), and outputting the feed-back signal obtained by adding the positive state value to the negative state value;

(d) repeating said (a) through (c) steps n+1 times;

(e) Viterbi decoding the PR(+1, −1) signal after performing said step (d) to generate Viterbi decoded data;

(f) unit-bit delaying the Viterbi decoded data to have a (1+D) characteristic which is an inverse characteristic of said precoder, and adding the delayed data to the Viterbi decoded data to generate PR4-mode decoded data;

(g) n-bit delaying the PR4-mode decoded data to have a $(1+D)^n$ characteristic, and adding the n-bit delayed data to the PR4-mode decoded data to generate $E^n$PR4-mode decoded data; and (h) selecting one of the PR4-mode decoded data and the $E^n$PR4-mode decoded data according to a PR4/$E^n$PR4 mode signal.

25. A data decoding method in a system having an $E^n$PR4 channel including a precoder having a $1/(1+D)^{n+1}$ characteristic, wherein D is a delay period corresponding to one bit of recorded data and n equals the number of delay periods D of the precoder, said data decoding method comprising the steps of:

(a) unit-bit delaying a PR(+1, −1) signal received through said $E^n$PR4 channel to generate a delayed signal having a (1+D) characteristic, and adding the delayed signal to the PR(+1, −1) signal to generate a PR4(+1, 0, −1) signal;

(b) subtracting the PR4(+1, 0, −1) signal from a feed-back signal to generate a PR(+1, −1) signal;

(c) detecting positive and negative state values of the PR(+1, −1) signal depending on positive and negative threshold values varying according to the PR(+1, −1) signal converted in said (b) step, and generating the feed-back signal by adding the positive state value to the negative state value;

(d) repeating said (a) through (c) steps m times, where m is an integer greater than n+1;

(e) Viterbi decoding the PR(+1, −1) signal after performing said step (d) step to generate Viterbi decoded data;

(f) n+1 bit delaying the Viterbi decoded data to have a $(1+D)^{n+1}$ characteristic, which is an inverse characteristic of said precoder, and adding the n+1 bit delayed data to the Viterbi decoded data to generate first decoded data decoded in an $E^n$PR4 mode;

(g) p bit delaying the first decoded data to have a $(1+D)^p$ (p=m−n−1) characteristic, adding the p bit delayed data to the first decoded data to generate a second decoded data; and (h) selecting one of the first decoded data and the second decoded data according to a mode signal.

* * * * *